United States Patent [19]

Wu

[11] Patent Number: 5,539,072
[45] Date of Patent: Jul. 23, 1996

[54] FABRIC LAMINATES

[75] Inventor: Huey S. Wu, Newark, Del.

[73] Assignee: W. L. Gore & Associates, Inc., Newark, Del.

[21] Appl. No.: 358,423

[22] Filed: Dec. 19, 1994

Related U.S. Application Data

[63] Continuation-in-part of Ser. No. 289,165, Aug. 11, 1994, Pat. No. 5,460,872, which is a continuation-in-part of Ser. No. 220,133, Mar. 30, 1994, Pat. No. 5,376,441, which is a division of Ser. No. 38,573, Mar. 26, 1993, abandoned.

[51] Int. Cl.$^6$ .................................................. C08F 20/58
[52] U.S. Cl. ...................... 526/304; 524/805; 428/304.4; 428/339
[58] Field of Search ............................ 526/304; 524/805; 428/304.4; 1/339

[56] References Cited

U.S. PATENT DOCUMENTS

| | | |
|---|---|---|
| 3,384,627 | 5/1968 | Anello et al. . |
| 3,645,990 | 2/1972 | Raynolds . |
| 3,818,074 | 6/1974 | Ahlbrecht . |
| 3,940,359 | 2/1976 | Chambers . |
| 4,566,981 | 1/1986 | Howells . |
| 4,668,726 | 5/1987 | Howells . |
| 4,722,904 | 9/1989 | Feil . |
| 4,864,006 | 9/1989 | Giannetti et al. . |
| 4,914,146 | 4/1990 | Honda . |
| 4,975,468 | 12/1990 | Yiv . |
| 4,985,282 | 1/1991 | Moggi et al. . |
| 5,077,097 | 12/1991 | Moggi et al. . |
| 5,151,217 | 9/1992 | Price . |
| 5,234,151 | 8/1993 | Harada . |
| 5,234,807 | 8/1993 | Texter . |

FOREIGN PATENT DOCUMENTS

| | | |
|---|---|---|
| 182516 | 5/1986 | European Pat. Off. . |
| 0193963 | 9/1986 | European Pat. Off. . |
| 0280312 | 8/1988 | European Pat. Off. . |
| 0315078 | 5/1989 | European Pat. Off. . |
| 0315841 | 5/1989 | European Pat. Off. . |
| 0414155 | 2/1991 | European Pat. Off. . |
| 0572269 | 12/1993 | European Pat. Off. . |
| 2515198 | 10/1981 | France . |
| 03109410 | 5/1991 | Japan . |
| 6510472 | 2/1966 | Netherlands . |
| 1237673 | 5/1984 | U.S.S.R. . |
| 9221715 | 12/1992 | WIPO . |
| 9308019 | 4/1993 | WIPO . |

OTHER PUBLICATIONS

Macromolecules, Polym. of Tetrahydrofurfuryl Methacrylate in Three–Component Anionic Microemulsions, Full, et al, 1992.
Chemical Abstracts, vol. 115, No. 22, 2 Dec. 1991, Columbus, Ohio Abstract No. 233147, "Acrylic Resin Aqueous Emulsions with Good Dispersion Stability" and Abstract of JP A,03 109 410 (Nitto Denko Corp.) 9 May 1991.
JA 63296940–Apr. 1993 (Toray–English Abstract).
JA 63296939–Dec. 1988 (Toray–English Abstract).
Derwent Publications Ltd., London, GB; AN 92–370610–JP, A,4272988 (Asahi Glass Co., Ltd.) 29 Sep. 1992.
Derwent Publications Ltd., London, GB; AN 93–299773–JP, A,52141 98 (Dainippon Ink & Chem). KK.) 24 Aug. 1993.

*Primary Examiner*—Joseph L. Schofer
*Assistant Examiner*—N. Sarofim
*Attorney, Agent, or Firm*—Gary A. Samuels

[57] ABSTRACT

Laminates of fabric and microporous polymeric substrates are taught which have enhanced oleophobic and hydrophobic properties. The enhanced properties are obtained by contacting the laminate or any of its components with an aqueous dispersion of polymer particles of an organic polymer having pendent fluorinated alkyl groups and in which the particles are very small, being on the order of 0.01–0.1 micrometer. The small size promotes uniformity of coating when the laminate or components are coated with the dispersion and then heated to flow the particles together.

18 Claims, No Drawings

FABRIC LAMINATES

CROSS-REFERENCE TO RELATED APPLICATION

This application is a continuation-in-part of U.S. patent application Ser. No. 08/289,165, filed Aug. 11, 1994, now U.S. Pat. No. 5,460,872, which is a continuation-in-part of U.S. patent application Ser. No. 08/220,133, filed Mar. 30, 1994, now U.S. Pat. No. 5,376,441, filed Mar. 26, 1993, which is a divisional of 08/038,573, abandoned.

FIELD OF THE INVENTION

This invention relates to fabric laminates containing coated materials where the coating is derived from an aqueous dispersion of submicron particles of a polymer having fluoroalkyl side chains.

BACKGROUND OF THE INVENTION

Microemulsions are known in the art. They are stable isotropic mixtures of oil, water, and surfactant. Other components, such as salt or a cosurfactant (an alcohol, amine, or other amphilic molecule) may also be part of the microemulsion formulation. The oil and water reside in distinct domains separated by an interfacial layer rich in surfactant. Because the domains of oil or water are small, microemulsions appear visually transparent or translucent, and are not birefringent. Unlike emulsions, microemulsions are equilibrium phases and form spontaneously upon contact of the ingredients.

Microemulsions can have a variety of microstructures, depending mainly on composition and temperature. The common structural feature is the presence of a surfactant-rich sheet separating oil-rich and water-rich domains. There are three most common structures. One is the so-called water-in-oil microemulsions, in which water is contained inside distinct domains (droplets) in a continuous oil-rich domain. A second is oil-in-water microemulsions in which oil is contained inside distinct domains in a continuous water-rich domain. The third is bicontinuous microemulsion in which there are sample-spanning intertwined paths of both oil and water, separated from each other by the surfactant-rich film (a sponge-like structure).

In contrast to bulk and solution polymerization, high reaction rates, high conversions and large molecular weights are achieved using either emulsion or microemulsion polymerization of unsaturated hydrocarbons, which are considered to be oils. In both cases the high rates and conversions and large molecular weights are thought to be obtained because the monomer molecules are concentrated in a number of sample regions or domains of the microemulsion, which facilitates reaction among themselves. Microemulsion polymerization has several advantages over traditional emulsion polymerization. First, emulsions are turbid and opaque, while microemulsions are usually transparent or translucent and so are particularly suitable for photochemical reactions. Second, microemulsion polymerization enables preparation of stable, monodisperse microlatexes containing particles smaller than those produced with classical emulsion polymerization processes. Finally, the structural diversity of microemulsions (droplet and bicontinuous) is set by thermodynamics, and rapid polymerization may be able to capture some of the original structure.

Modification of porous substrates by coating them with fluorinated polymers is known in the literature, thus, porous substrates can be coated with oil and water-repellent polymers in order to increase their hydrophobicity and oleophobicity. However, such processes normally require expensive and/or environmental-hazardous fluorinated solvents, such as CFCs. Moreover, water-based emulsion polymerization of fluorinated monomers usually yields particles with sizes in the range of 0.1–10 micron, which makes it difficult to give uniform coatings on substrates having submicron pore structures. In addition, such large particle sizes result in coatings that can clog the pores of submicron pore structures, which is detrimental in many applications.

It would be desirable, therefore, to provide new articles based on the use of such coated substrates.

SUMMARY OF THE INVENTION

This invention is directed to fabric laminates containing coating materials where the coating is derived from the polymerization of a microemulsion to produce submicron polymer particles.

In the invention, fabrics, such as are useful in garments or filters, are laminated, in whole or in part, to a microporous polymeric material, in which the laminate contains an organic polymer having recurring pendant perfluorinated organic side chains applied from an aqueous dispersion in which the polymer particles have an average size between 0.01 and 0.1, micrometers.

By "fabric" is meant a material made from fibers, and includes, woven, nonwoven, knits, felts, etc.

By "microporous" is meant that the morphology of the microporous polymeric material is such that micropores extend from one side of the material to the other. An example is a membrane of porous, expanded polytetrafluoroethylene, which is described in detail in U.S. Pat. No. 3,953,566 to Gore and comprises a microstructure of nodes interconnected by fibrils.

By using the aqueous dispersion of microemulsion polymerized particles, the particles of polymer are very small and thus can be uniformly coated on to the surface of the walls of the pore interior, where upon application of heat, they melt and flow together to form a thin uniform coating on the walls, which results in maximum imparting of the polymers oleophobic and hydrophobic properties to the laminate.

In one embodiment the organic polymer is distributed or located throughout the laminate. This is most easily achieved by dipping the laminate in the aqueous solution of the polymer particles, followed by heating to melt the polymer particles.

In another embodiment, the organic polymer coats the pore interior of the microporous polymeric material. This is also most easily achieved by dipping the polymeric material in the aqueous dispersion, following by heating to melt the particles and cause them to flow around the surface of the pore interior.

In still another embodiment, the organic polymer is located in the fabric. Again, this is achieved by dipping or spraying.

DETAILED DESCRIPTION OF THE INVENTION

The preparation of the aqueous dispersion of polymeric particles depends on careful selection of the ingredients of the monomeric microemulsion from which the polymers are made. The monomeric microemulsions of the invention are prepared by mixing water, unsaturated organic monomers having pendant fluoroalkyl groups, fluorosurfactants, and optionally, co-solvents or inorganic salts. The amounts employed are 1–40 weight percent, preferably 5–15, fluorinated monomer; 1–40 weight percent, preferably 5–25, of the surfactant; with the remainder water.

Additional monomers can be present to make copolymers, but the monomers having pendant perfluoroalkyl groups should comprise at least 30, preferably 50, and most preferably 70, weight percent of the total monomer content. Examples of additional monomers include unsaturated organic hydrocarbons, such as olefins; and nonfluorinated acrylic or methacrylic monomers. It is desirable in some instances to add a crosslinking agent. A wide range of crosslinking monomers can be present, including monomers having functional groups and/or unsaturated groups that can form covalent bonds through an addition or condensation reaction. Examples include allylglycidyl ether, perfluoroalkyl maleic acid ester, N-methylol acrylamide, N-methylol methacrylamide, glycidyl acrylate, glycidyl methacrylate, aziridinyl acrylate, aziridinyl methacrylate, diacetone acrylamide, diacetone methacrylamide, methylolated diacetone acrylamide, methylolated diacetone methacrylamide, ethylene diacrylate, ethylene dimethacrylate, hydroxyalkyl acrylate, and hydroxyalkyl methacrylate.

Representative organic monomers having pendant perfluoroalkyl groups include fluoroalkyl acrylates and fluoroalkyl methacrylates having terminal perfluoroalkyl groups of the formula:

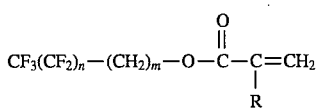

wherein n is a cardinal number of 1–21, m is a cardinal number of 1–10, and R is H or CH$_3$; fluoroalkyl aryl urethanes, for example

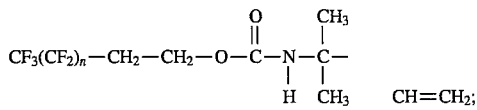

fluoroalkyl allyl urethanes, for example

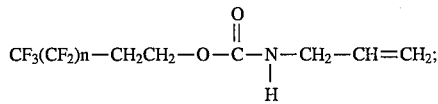

fluoroalkyl maleic acid esters, for example

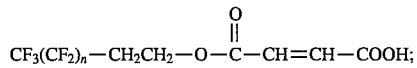

fluoroalkyl urethane acrylates;
fluoroalkyl acrylamides; fluoroalkyl sulfonamide acrylates and the like.

It is understood that in the perfluorinated alkyl end group CF$_3$(CF$_2$)$_n$ it is difficult to prepare a compound in which n is a single numeral and that the end group is commonly a mixture of groups having varying chain lengths in which n is a mixture of predominantly 5, 7, 9 and 12.

The fluorinated surfactants used have the general formula $R_f R\ Y\ X$, where $R_f$ is a perfluoroalkyl group or a perfluoroalkylether group with carbon number from 1 to 15 and preferably from 6 to 9 and R is for example an alkylene group or an alkylene thioether (—CH$_2$—S—CH$_2$—) linkage with carbon number from 0 to 4. For fluorinated anionic surfactants, Y is for example a carboxylate group (COO—), sulfonic group (SO$_3$—), or sulfate group (SO$_4$—) and X is an alkaline metal ion or ammonium ion. For fluorinated nonionic surfactants, Y is for example an oxyethylene (OCH$_2$CH$_2$)m linkage where m is an integer from 1 to 15 and preferably from 3 to 9 and X is a hydroxyl group. For fluorinated cationic surfactants, YX is for example a quaternary ammonium salt.

To polymerize the microemulsion described above, the temperature of the monomeric microemulsion is adjusted to between 5° and 100° C., preferably 5°–80° C., and free radical producing polymerization initiator added. Preferred initiators include persulfates, azo initiators, for example 2,2-azobis (2-amidopropane) dihydrochloride; peroxides, or photo initiators such as ultraviolet initiators and gamma ray initiators. Amounts of initiators present can range from 0.01 to 10 percent by weight based on monomer content. Co-solvents such as an alcohol, amines or other amphophilic molecules, or salt can be employed if desired to facilitate formation of the microemulsion.

Introduction of the initiator causes polymerization of the monomer to begin and the reaction proceeds. The resulting polymer particle latex has an average particle size of between 0.01 and 0.1, preferably 0.01 to 0.05 and most preferably less than 0.04 or 0.03, micrometer and a polymer average molecular weight of over 10,000, preferably over 50,000. The unusually small particle size provides a polymer system with a number of advantages over systems containing larger particles. The system is a colloidal dispersion and is usually clear rather than turbid. The small particle size aids in producing coatings of uniform thickness and maintains good gas permeability of the microporous polymeric material substrates. The highly fluorinated nature of the pendant groups in the polymer chain aids in increasing the hydrophobicity and oleophobicity of the substrates to which the polymer is applied.

The polymer so produced can be conveniently applied to the fabric laminate, or to the fabric or to the microporous polymeric material before lamination. Application can be conveniently carried out directly from aqueous colloidal dispersion, by roll coating, mayer rod coating, by immersion, by painting, by spraying, or by using a doctor knife. Suitable microporous substrates include microporous polymeric membranes of any form including sheets such as porous olefins, e.g., polyethylene or polypropylene, polyurethane and porous PTFE.

In addition, it is possible to apply the monomeric microemulsion to the substrates and then cause the microemulsion to polymerize by photo initiation.

Once the coating is applied, any water, surfactant or initiator remaining can be drawn off by any convenient means, such as heating, steam stripping, vacuum evaporation or the like.

The polymer particles will impart their properties to the coated substrate and can be used to achieve desired properties in the substrates. For example, oleophobicity and hydrophobicity can be provided by imbibing polymer particles of fluoroalkyl acrylates or methacrylates to form a coating. Polymer particles of alkylacrylates or methacrylates impart hydrophobicity. Polymer particles of acrylonitriles, vinyl acetates and other functionalized acrylates and methacrylates can provide either hydrophilicity and oleophilicity or can provide the opposite (hydrophobicity or oleophobicity) depending on the functional groups employed.

By using polymer particle coatings made from polymerization of microemulsions of monomers, the particles will have a very high molecular weight (greater than $1 \times 10^5$). This results in coatings of good durability because the high molecular weight renders the polymers less susceptible to dissolving organic solvents. The small particle size also aids in formation of uniform coatings on the pore interior.

In addition, the coating dispersion is a waterbase dispersion and thus, being solvent free, is environmentally acceptable.

When the polymer is applied to the microporous polymeric substrate, the polymer is ordinarily present as a coating on the internal structure of the substrate that makes up the pores. Since the organic polymer imparts oleophobic and hydrophobic properties, the microporous polymeric substrate is preferably made of a hydrophobic polymer. A particularly preferred microporous polytetrafluoroethylene polymeric substrate is made by stretching polytetrafluoroethylene tape or film as described in Gore U.S. Pat. No. 3,953,566. In this procedure, the structure comprises an interconnected network of nodes and fibrils interconnecting the nodes, the nodes and fibrils comprising the internal structure that defines the pores. The polymer coats the nodes and fibrils.

The fabric can be any material comprised of fiber, such as woven material, nonwoven materials, knit material, scrim material, felt material, fleece material, or the like. The fabrics ordinarily contain interstices or pores, i.e., passageways through the fabric, and the coating may be adhered to the interstices wall or pore walls in like manner as described above.

Lamination of fabric to microporous polymeric material can be achieved by applying the fabric to the microporous substrate using heat and/or pressure. Commonly, lamination will be achieved by using an adhesive. If the fabric and the coated substrate are water-vapor permeable, the adhesive used should be either water-vapor permeable or should be applied in any discontinuous pattern, so the laminate can retain its water-vapor permeable properties. Convenient water-vapor permeable adhesives include polyurethanes that have a preponderance of oxy(ethylene) units in the soft segment. Such polyurethane adhesives are frequently used with an expanded microporous polytetrafluoroethylene substrate, which is a water-vapor permeable liquid water resistant membrane.

The laminates are flexible and can be used to make water vapor permeable garments with good hydrophobic and oleophobic properties, such as coats, shirts, trousers, hats, gloves, shoes, socks and the like. In these applications, the laminate can form a liner, shell, outer layer, inner layer, or intermediate layer or the like. The laminates are also useful in medical applications such as in surgical gowns for viral barrier protection, and other protective products, including sheets, pillows, drapes, and the like.

The laminates are also useful as filtration media, such as air filters and the like. They are useful in humidifiers and conditioners. The resulting coated microporous polymeric substrates can be used to provide gas permeable articles of enhanced hydrophobic and oleophobic properties. This makes them useful as gas filters, vent filters and as insulation for electrical wiring.

TEST PROCEDURES

Particle Size Determination

Quasielastic light scattering was used to determine particle size. Microemulsion samples obtained as described in the examples were diluted with water to 100 times the original volume to eliminate interparticle interactions. Quasielastic light scattering cumulant functions were measured at 25° C. with a Brookhaven Model 9000AT goniometer and correlator at a scattering angle of 90°. Correlation functions were fit to a two term cumulant expression to determine the apparent diffusion coefficient, which was assumed to correspond to the reported particle size via the Stokes-Einstein relation. The solvent viscosity was assumed to be that of water.

Molecular Weight

Molecular weight was determined after precipitating and washing the polymer with acetone. The washed polymer was dissolved in Fluorinert® FL- 75° at 50° C. Molecular weight and polymer concentration were determined at room temperature using a Viscotek Model 600 RALLS and differential refractometer operating at a wavelength of 0.67 micrometer. The Viscotek Model 600 RALLS instrument records the light scattered intensity at a scattering angle of 90°, and this value is related to polymer molecular weight using the principles of classical light scattering.

Air Permeability—Gurley Number Test

Gurley numbers were obtained as follows:

The resistance of samples to air flow was measured by a Gurley densometer (ASTM D726-58) manufactured by W. & L.E. Gurley & Sons. The results are reported in terms of Gurley Number which is the time in seconds for 100 cubic centimeters of air to pass through 1 square inch of a test sample at a pressure drop of 4.88 inches of water.

Oil Repellency Test

In these tests, oil rating was carried out by AATCC Test Method 118- 1983. The higher the number, the better the oil repellency.

Bubble Point

Bubble Point was measured according to the procedures of ASTM F316-86. Isopropyl Alcohol was used as the wetting fluid to fill the pores of the test specimen.

The Bubble Point is the pressure of air required to displace the isopropyl alcohol from the largest pores of the test specimen and create the first continuous stream of bubbles detectable by their rise through a layer of Isopropyl Alcohol covering the porous media. This measurement provides an estimation of maximum pore size.

Porosity

Porosity is determined by dividing the bulk density by the theoretical density of a solid nonporous material from which the porous material is made.

Synthetic Perspiration Test—Evaporative Method

The purpose of this test is to simulate the effect of human perspiration on the waterproofness of materials. In this test, a specific volume of synthetic perspiration is evaporated through the test sample mounted in a fixture. Samples are then rinsed and dried before they are checked for leakage. Water pressure is applied to the sample at low pressure of one psi. If water breakthrough occurs, this is judged as a leak and, therefore, the material does not maintain its waterproofness after exposure to synthetic perspiration. Otherwise, water breakthrough does not occur, sample does not leak, indicating waterproofness has been maintained.

Moisture Vapor Transmission Rate Test (MVTR)

In this procedure, approximately 70 ml. of a solution consisting of 35 parts by weight of potassium acetate and 15 parts by weight of distilled water was placed into a 133 ml. polypropylene cup, having an inside diameter of 6.5 cm at its mount. An expanded polytetrafluoroethylene (PTFE) membrane having a minimum MVTR of approximately 60,000 g/m$^2$/24 hrs as tested by the method described in U.S. Pat. No. 4,862,730 to Crosby using potassium acetate and available from W. L. Gore & Associates, Inc., of Newark, Del., was heat sealed to the lip of the cup to create a taut, leakproof, microporous barrier containing the solution.

A similar expanded PTFE membrane was mounted to the surface of a water bath. The water bath assembly was controlled at 23° C. plus or minus 0.2° C., utilizing a temperature controlled room and a water circulating bath.

The sample to be tested was allowed to condition at a temperature of 23° C. and a relative humidity of 50% prior to performing the test procedure. Samples were placed so the microporous polymeric membrane to be tested was in contact with the expanded polytetrafluoroethylene membrane mounted to the surface of the water bath and allowed to equilibrate for at least 15 minutes prior to the introduction of the cup assembly.

The cup assembly was weighed to the nearest 1/1000 g. and was placed in an inverted manner onto the center of the test sample.

Water transport was provided by the driving force between the water in the water bath and the saturated salt solution providing water flux by diffusion in that direction. The sample was tested for 15 minutes and the cup assembly was then removed and weighed again. The MVTR is calculated from the weight gain of the cup assembly and expressed in gm of water per square meter of sample surface area per 24 hours.

Suter Test

Samples of materials were tested for waterproofness by using a modified Suter test method, which is a low water entry pressure challenge. The test consists essentially of forcing water against one side of a test piece, and observing the other side of the test piece for indications of water penetration through it.

The sample to be tested is clamped and sealed between rubber gaskets in a fixture that holds the test piece inclined from the horizontal. The outer surface of the test piece faces upward and is open to the atmosphere, and to close observation. Air is removed from inside the fixture and pressure is applied to the inside surface of the test piece, over an area of 7.62 cm (3.0 inches) diameter, as water is forced against it. The water pressure on the test piece was increased to 2 psi for sample L6 (see Examples) and to 1 psi for samples L1 to L5 by a pump connected to a water reservoir, as indicated by an appropriate gauge and regulated by an in-line valve.

The outer surface of the test piece is watched closely for the appearance of any water forced through the material. Water seen on the surface is interpreted as a leak. A sample achieves a passing grade when, after 3 minutes, no water is visible on the surface.

Elbow Lean Test

A pad is saturated with a synthetic blood solution with a surface tension adjusted to 40 dynes/cm. Test specimens are placed on the pad and pressure from an elbow applied to simulate pressure at the elbow of a garment. If no penetration is observed, the sample has passed the test.

Viral Penetration Test ES22-1992

ASTM ES22-1992 was followed for this test. This test determines the ability of a material to resist the penetration of a microorganism under constant contact. This test method has been specifically designed for modeling viral penetration of the hepatitis B, hepatitis C, and human immunodeficiency viruses. Since these organisms are difficult to use, the test utilizes a bacteriophage, Phi-X174. Phi-X174 is one of the smallest known viruses at 0.027 microns in diameter, and it is similar in size and shape to the hepatitis C virus, the smallest blood borne pathogen (FIG. 2). The test sample is mounted onto a cell separation the microbial challenge and a view port. The time and pressure protocol specifies atmospheric pressure for 5 minutes, 2.0 psi for 1 minute, and atmospheric pressure for 54 minutes. The test is terminated if visible liquid penetration occurs before or at 60 minutes. A very sensitive microbial assay is performed to determine the passing or failing result, even in the absence of visible liquid penetration. Fabrics which pass this test are considered to be highly protective against liquid and microbial penetration.

EXAMPLES

I. Dispersion A

A. In a 4-liter steel reactor, 2500 g deionized water and 320 g ammonium perfluorooctanoate (Fluorad FC-143 made by 3M) were charged. The reactor was purged with argon gas (3 psig) for 15 minutes. The reactor was sealed. The mixture inside the reactor was heated to 80° C. with a stirring speed of 600 rpm.

B. Then, 200 grams of a fluoroacrylate with pendant fluroalkyl groups (Zonyl TA-N made by dupont) $CH_2=CHCOOCH_2CH_2R_f$ where $R_f$ is perfluorinated C4 to C16, 4 grams of allylglycidylether (AGE)+ 4 grams of tertbutylacrylate (TBA) were premixed at 50° C. then were charged to the reactor. Afterwards, 2 grams of V-50 (made by Wako) (believed to be 2.2-azobis (2-amidopropane)dihydrochloride)free radical initiator predissolved in 100 g $H_2O$ was charged to the reactor to initiate the microemulsion polymerization. The reaction was allowed to proceed at 80° C. for an hour.

C. Step (B) was repeated, except that 180 g TA-N, 3.6 g AGE, 3.6G TBA, and 1.87 g V-50 were used.

D. Step (B) was repeated, except that 160 g TA-N, 3.2 g AGE, 3.2 g TBA and 1.6 g V-50 were used.

E. Step (B) was repeated, except that 140 g TA-N, 2.8 g AGE, 2.8 g TBA and 1.4 g V-50 were used.

The final mixture was cooled to room temperature and diluted with distilled water to a total of 10,000 g clear dispersion. Average particle size was determined by light scattering technique to be about 0.034 micrometer. Molecular weight of the polymer produced was determined to be greater than 1 million.

II. Dispersion B

The experimental procedure was the same as that for Dispersion A above, except that a fluoro-methacrylate with pendant fluoroalkyl side chains (Zonyl TM made by dupont)

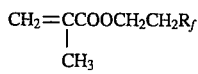

was used to replace the fluoroacrylate, Zonyl TA-N. Average particle size and molecular weight is similar to dispersion A product.

III. Coating of Membrane Substrates

Expanded PTFE membranes obtained from W. L. Gore & Associates, Inc., were coated with Dispersion A formulation and Dispersion B formulation by dipping, then oven dried at 220° C. to remove water and ammonium perfluorooctanoate and to allow the polymer to flow and form a fine coating on the fibrils and nodes of the expanded PTFE microstructure. Two types of membranes were coated: One, membrane A, is a membrane with a weight of 17 gram/m², a bubble point of 20–25 psi, a porosity of about 80%, and a thickness of about 50 micrometer. Another, membrane B, is a membrane with a weight of 23 gram/m², a bubble point of 20–25 psi, a porosity about 80%, and a thickness of about 65 micrometer.

IV. Testing of Coated Membranes

The coated membranes were tested for oil repellency and air permeability with the following results:

| Membranes | Oil rating | Air permeability (Gurley) |
|---|---|---|
| (a) Membrane A uncoated | 1 | 8 seconds |
| (b) Membrane B uncoated | 1 | 9 seconds |
| (c) Membrane A coated with Dispersion A | 8 | 10 seconds |
| (d) Membrane A coated with Dispersion B | 7 | 10 seconds |
| (e) Membrane B coated with Dispersion A | 8 | 11 seconds |

IV. Preparation of Laminates

The above coated membranes were laminated using a polyurethane adhesive in a dot pattern to nylon taslite fabric, Nomex pajama check fabric and US 101 polyester fabric, respectively. The laminates are identified as follows:

| Laminates | |
|---|---|
| L1 = membrane (a) + nylon taslite | 2 layer |
| L2 = membrane (b) + Nomex pajama check | 2 layer |
| L3 = membrane (c) + nylon taslite | 2 layer |
| L4 = membrane (d) + nylon taslite | 2 layer |
| L5 = membrane (e) + nomex pajama check | 2 layer |
| L6 = polyester (US101) + membrane (e) + polyester tricot knit | 3 layer |

US 101 is 100% polyester fabric with the face being a 2.2 oz/m² plain weave. The tricot knit was 1.8 oz/m². The materials were adhered in a gravure pattern.

V. Testing of Laminates a) The laminates were subjected to the synthetic perspiration evaporative test, with the following results:

Laminate L1: fail, leak water
L2: fail, leak water
L3: pass, waterproof
L4: pass, waterproof
L5: pass, waterproof
L6: pass, waterproof b) The moisture vapor transmission rate (MVTR). Initial MVTR's were at least about 14,000 gm/m²/24 hours for all laminates L1–L6.

c) After 20 standard home laundry cycles on L3, L4, and L5, the oil repellency rate on the membrane side remained the same as unwashed samples.

d) Test results after wash/dry/autoclave sequence (WDA).

This wash/dry/autoclave (WDA) sequence is carried out as follows:

Wash Cycle

In this cycle, the listed steps were carried out in sequence.

| Step | Time(min) | Chemical | Method A | Method B |
|---|---|---|---|---|
| Flush | 2 | | | |
| Flush | 2 | | | |
| Break | 8 | detergent added | 170° F. | 160° F. |
| Suds | 8 | | 180° F. | 160° F. |
| Bleach | 8 | bleach added only in Method B | | yes |
| Rinse | 2 | | | |
| Rinse | 2 | | | |
| Rinse | 2 | | | |
| Rinse | 2 | | | |
| Acid | 5 | acid added | | |

Dry Cycle

190° F. for 30 minutes, then cool down for 5 minutes.

Autoclave Cycle

The autoclave used was made by Amsco, Model No. 2013. The laminates were placed in the autoclave and were sterilized for 4 minutes at 270° F. (132° C.) and dried for 15 minutes.

The L6 laminate was subjected to a number of WDA cycles (one cycle being sequence set forth above), and tested in various tests after a number of cycles. Results are shown following, where P means passed

DURABILITY OF L6 LAMINATE

| Method Followed | Number of WDA Cycles | MVTR | Suter | Elbow Lean | Shrinkage | Alcohol Spray | ES22 Pass | Retest |
|---|---|---|---|---|---|---|---|---|
| Method A | 0 | 14188 | P | P | | | 3 | |
| | 0 | 14333 | P | P | | | 3 | |
| | 10 | 12203 | P | P | | | | |
| | 10 | 12255 | P | P | 6.7 | P | | |
| | 20 | 11820 | P | P | 7.1 | | | |
| | 20 | 12146 | P | P | 7.5 | P | | |
| | 30 | 11410 | P | P | 7.75 | P | | |
| | 30 | 11150 | P | P | 8.25 | P | | |
| | 40 | 16933 | P | P | 8.6 | P | | |
| | 40 | 11549 | P | P | 9.3 | P | | |
| | 50 | 10774 | P | P | 9.1 | P | | |
| | 50 | 11236 | P | P | 9.6 | P | | |
| | 60 | 10850 | P | P | 9.6 | P | | |
| | 60 | 10421 | P | P | 9.6 | P | | |
| | 70 | 10779 | P | P | 10 | P | | |
| | 70 | 10803 | P | P | 10 | P | | |
| | 80 | 9802 | P | P | 10 | P | | |
| | 80 | 10478 | P | P | 10.1 | P | | |
| | 90 | 9038 | P | P | 10 | P | | |
| | 90 | 9345 | P | P | 10.3 | P | | |
| | 100 | 7812 | P | P | 10 | P | 2(<1) | 1(6) |
| | 100 | 9420 | P | P | 10 | P | 3(<1) | |
| Method B | 0 | 14333 | P | P | | | 3 | |
| | 0 | 14188 | P | P | | | 3 | |
| | 10 | 11758 | P | P | 6.25 | P | | |
| | 10 | 11688 | P | P | 6 | P | | |
| | 20 | 11161 | P | P | 7 | P | | |
| | 20 | 11636 | P | P | 7 | P | | |
| | 30 | 11491 | P | P | 7.6 | P | | |
| | 30 | 11184 | P | P | 7.5 | P | | |
| | 40 | 10953 | P | P | 8 | P | | |
| | 40 | 10947 | P | P | 8 | P | | |
| | 50 | 10710 | P | P | 8.2 | P | | |
| | 50 | 10716 | P | P | 8 | P | | |
| | 60 | 10884 | P | P | 8.2 | P | | |
| | 60 | 10889 | P | P | 8.2 | P | | |
| | 70 | 10503 | P | P | 9 | P | | |
| | 70 | 10792 | P | P | 9 | P | | |
| | 80 | 10215 | P | P | 9 | P | | |
| | 80 | 9293 | P | P | 9 | P | | |
| | 90 | 10768 | P | P | 8.2 | P | | |
| | 90 | 10840 | P | P | 9.5 | P | | |
| | 100 | 10388 | P | P | 9.5 | P | 3(<1) | |
| | 100 | 10426 | P | P | 9.5 | P | 3(<1) | |

As seen above, the hydrostatic challenge (Surer test) did not cause leakage up to 100 WDA cycles. There was no visible strike-through of synthetic blood (Elbow lean test) up to 100 WDA cycles. Of the species tested by the viral challenge method, all passed but one which requires retesting (having 6 plaque forming units).

When sprayed with isopropyl alcohol, the samples did not clarify up to 100 cycles. At 100 WDA cycles, the L6 laminate had not begun to separate layers. The WDA cycles were continued for another 100 cycles and the L6 laminate had still not begun to separate.

I claim:

1. A laminate comprising:
   (a) a fabric adhered to
   (b) a microporous polymeric substrate, in which the laminate contains an organic polymer having recurring pendent fluorinated organic side chains applied from an aqueous dispersion in which the polymer particles in the dispersion have an average particle size between 0.01 and 0.1 micrometers.

2. The laminate of claim 1 wherein the organic polymer is present in the microporous polymeric substrate.

3. The laminate of claim 1 wherein the organic polymer is present in the fabric.

4. The laminate of claim 1 wherein the organic polymer is present in both the substrate and the fabric.

5. The laminate of claim 1 wherein the average particle size of the polymer particles of the aqueous dispersion is between 0.01 and 0.05 micrometer.

6. The laminate of claim 1, 2, 3, 4, or 5 in which the organic polymer comprises a polymer selected from the class consisting of polymers derived from fluoroalkyl acrylates, fluoroalkyl methacrylates, fluoroalkyl aryl urethanes, fluoroalkyl allyl urethanes, fluoroalkyl maleic acid esters, fluoroalkyl urethane acrylates, fluoroalkyl acrylamides, and fluoroalkyl sulfonamide acrylates.

7. The laminate of claim 1, 2, 3, 4 or 5 wherein the organic polymer having recurring pendent fluorinated organic side chains is crosslinked.

8. The laminate of claim 1, 2, 3, 4 or 5 in which the organic polymer comprises a polymer containing recurring units derived from

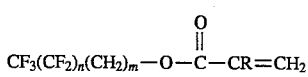

wherein R is hydrogen or methyl, n is an integer between 1 and 21, and m is an integer between 1 and 10.

9. The laminate of claim 8, wherein the only recurring units of the organic polymer are derived from

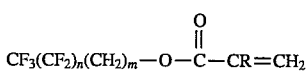

wherein R is hydrogen or methyl, n is an integer between 1 and 21, and m is an integer between 1 and 10.

10. The laminate of claim 1 wherein the microporous polymeric substrate is a microporous film of polytetrafluoroethylene in which the microporous structure is found by nodes interconnected with fibrils.

11. The laminate of claim 10 wherein the organic polymer is present in the microporous film.

12. The laminate of claim 10 wherein the organic polymer is present in the fabric.

13. The laminate of claim 10 wherein the organic polymer is present in both the film and the fabric.

14. The laminate of claim 10 wherein the average particle size of the polymer particle of the aqueous dispersion is between 0.01 and 0.05 micrometers.

15. The laminate of claim 10, 11, 12, 13 or 14 in which the organic polymer comprises a polymer selected from the class consisting of polymers derived from fluoroalkyl acrylates, fluoroalkyl methacrylates, fluoroalkyl aryl urethanes, fluoroalkyl allyl urethanes, fluoroalkyl maleic acid esters, fluoroalkyl urethane acrylates, fluoroalkyl acrylamides, and fluoroalkyl sulfonamide acrylates.

16. The laminate of claim 10, 11, 12, 13 or 14 wherein the organic polymer having recurring pendent fluorinated organic side chains is crosslinked.

17. The laminate of claim 10, 11, 12, 13 or 14 in which the organic polymer comprises a polymer containing recurring units derived from

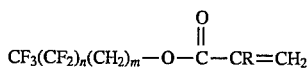

wherein R is hydrogen or methyl, n is an integer between 1 and 21, and m is an integer between 1 and 10.

18. The laminate of claim 17 wherein the only recurring units of the organic polymer are derived from

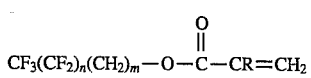

wherein R is hydrogen or methyl, n is an integer between 1 and 21, and m is an integer between 1 and 10.

* * * * *